United States Patent [19]

Peng et al.

[11] Patent Number: 5,642,275

[45] Date of Patent: Jun. 24, 1997

[54] MULTILEVEL CASCADE VOLTAGE SOURCE INVERTER WITH SEPERATE DC SOURCES

[75] Inventors: Fang Zheng Peng, Oak Ridge; Jih-Sheng Lai, Knoxville, both of Tenn.

[73] Assignee: Lockheed Martin Energy System, Inc., Oak Ridge, Tenn.

[21] Appl. No.: 527,995

[22] Filed: Sep. 14, 1995

[51] Int. Cl.$^6$ .................................................. H02M 7/521
[52] U.S. Cl. ........................................ 363/137; 363/58
[58] Field of Search ........................... 363/58, 59, 129, 363/132, 136, 137; 323/271, 282

[56] References Cited

U.S. PATENT DOCUMENTS

| | | | |
|---|---|---|---|
| 5,270,657 | 12/1993 | Wirth et al. | 324/322 |
| 5,311,419 | 5/1994 | Shires | 363/129 |
| 5,481,448 | 1/1996 | Nakata et al. | 363/137 |
| 5,535,114 | 7/1996 | Horie et al. | 363/137 |

*Primary Examiner*—Stuart N. Hecker
*Attorney, Agent, or Firm*—Vincent A. Branton; James M. Spicer

[57] ABSTRACT

A multilevel cascade voltage source inverter having separate DC sources is described herein. This inverter is applicable to high voltage, high power applications such as flexible AC transmission systems (FACTS) including static VAR generation (SVG), power line conditioning, series compensation, phase shifting and voltage balancing and fuel cell and photovoltaic utility interface systems. The M-level inverter consists of at least one phase wherein each phase has a plurality of full bridge inverters equipped with an independent DC source. This inverter develops a near sinusoidal approximation voltage waveform with only one switching per cycle as the number of levels, M, is increased. The inverter may have either single-phase or multi-phase embodiments connected in either wye or delta configurations.

16 Claims, 10 Drawing Sheets

MULTILEVEL CASCADE VOLTAGE SOURCE INVERTER WITH SEPERATE DC SOURCES

This invention was made with Government support under contract DE-AC05-84OR21400 awarded by the U.S. Department of Energy to Lockheed Martin Energy Systems, Inc. and the Government has certain rights in this invention.

FIELD OF THE INVENTION

The present invention relates to a multilevel voltage source inverter with separate DC sources, and more particularly to a multilevel voltage source inverter with separate DC sources including an apparatus and a method for use in flexible AC transmission system (FACTS) applications such as compensating reactive power and voltage balancing.

BACKGROUND

With long distance electrical power transmission and load growth, active control of reactive power (VAR) is indispensable with regard to stabilizing power systems and maintaining supply voltages. Static VAR generators (SVGs) using voltage-source inverters have been widely accepted as the next generation of reactive power controllers for power systems replacing conventional VAR compensators such as Thyristor Switched Capacitors (TSCs) and Thyristor Controlled Reactors (TCRs).

Delivering power from a power generating station to the ultimate power consumers over long transmission lines can be very costly for an electric utility. The electric utility passes on these costs to the ultimate consumers as higher electricity bills. Inductive and capacitive losses affect a reactive component of power which is measured in volt-ampere-reactive (VAR) units. These reactive power (VAR) losses may be compensated using a static VAR compensator to more economically transmit thereby reducing overall electricity bills as well as stabilizing the supplied voltage to the end user.

The state of the art VAR compensating approach uses transformer coupling voltage source inverters. A transformer coupling voltage source inverter comprising eight six-pulse converters connected in either a zig-zag, wye or delta configuration has a 48-pulse or a 48-step staircase inverter output voltage waveform which dramatically reduces harmonics. The major problem of using this transformer coupling approach resides in the transformer as a function of harmonic neutralizing magnetics. The transformer with the inherent harmonic neutralizing magnetics deficiency:

(a) is the most expensive equipment in the system;

(b) produces approximately 50% of the total system losses;

(c) occupies approximately 40% of the system layout; and (d) causes difficulties in system control due to DC magnetizing and surge overvoltage problems resulting from saturation of the transformers on the transient state.

In recent years, a relatively new type of inverter, a multilevel voltage source inverter, has attracted the attention of many researchers. The transformerless multilevel inverter can reach high voltage and minimize induced harmonics as a function of inverter structure.

A multilevel, referred to as M-level, diode clamped inverter can reach high performance without the benefit of transformers. This inverter does, however, require the implementation of additional clamping diodes. The number of diodes required is equal to $(M-1)*(M-2)*3$ for an M-level inverter. For example, if M=51, for direct connection to a 69 kV power system, then the number of required clamping diodes will be 7350. These clamping diodes not only increase the cost of the system but also cause packaging/layout problems and introduce parasitic inductances into the system. Thus, for practicality, the number of levels of a conventional multilevel diode clamped inverter is typically limited to seven or nine levels.

A relatively new inverter structure, the multilevel flying capacitor inverter has the capability to solve the voltage balance problems and aforementioned problems associated with the multilevel diode clamped inverters. The required number of flying capacitors for an M-level inverter, provided that the voltage rating of each capacitor used is the same as the main power switches is determined by the formula, $(M-1)*(M-2)*3/2+(M-1)$. Using the assumption of having capacitors with the same voltage rating, an M-level diode clamped inverter requires only $(M-1)$ capacitors. Therefore, the flying capacitor inverter requires capacitors of substantial size compared with the conventional inverter. In addition, control is very complicated and higher switching frequency is required to balance the voltages between each capacitor in the inverter.

A multilevel cascade inverter with separate DC sources for reactive power compensation in AC power systems which is directed toward overcoming and is not susceptible to the above limitations and disadvantages is described herein. The multilevel voltage source inverter having separate DC sources eliminates the excessively large number of transformers required by conventional multipulse inverters, clamping diodes required by multilevel diode-clamped inverters and flying capacitors required by multilevel flying-capacitor inverters. The multilevel voltage source inverter having separate DC sources also has the following features:

(a) the multilevel voltage source inverter having separate DC sources is more suitable to high voltage, high power applications than conventional inverters;

(b) the multilevel voltage source inverter having separate DC sources generates a multistep staircase voltage waveform with the switching of each device only once per line cycle, thus reaching a nearly sinusoidal output voltage approximation by increasing the number of voltage levels;

(c) since the multilevel voltage source inverter having separate DC sources consists of cascade connections of a plurality of single-phase full bridge inverters fed with a separate DC source, neither voltage balancing nor voltage matching of switching devices is required; and (d) system packaging and layout is streamlined due to the simplicity and symmetry of structure as well as the minimization of component count.

Thus, a need for a multilevel cascade voltage source inverter with separate DC sources for reactive power compensation in AC power systems is clearly evident.

OBJECTS OF THE INVENTION

Accordingly, it is an object of the present invention to provide a new and improved multilevel cascade voltage source inverter and more specifically a multilevel cascade voltage source inverter for connecting to an AC high voltage, high power system.

It is another object to provide a wye configured multilevel voltage source inverter for FACTS applications such as VAR compensation and voltage balancing of AC power systems.

It is another object to provide a delta configured multilevel voltage source inverter for FACTS applications such as VAR compensation and voltage balancing of AC power systems.

It is another object to provide a multilevel voltage source inverter for connecting to an AC high voltage, high power system for a variety of applications such as fuel cells, photovoltaic utility interface systems.

It is another object to provide a method for controlling the multilevel voltage source inverter to supply a sinusoidal approximation power waveform to an AC high voltage, high power system for a variety of applications from a plurality of DC voltage sources.

Further and other objects of the present invention will become apparent from the description contained herein.

SUMMARY OF THE INVENTION

In accordance with one aspect of the present invention, a multiple voltage source inverter for connecting to an AC power system comprising a plurality of full bridge inverters having a primary node and a secondary node, each of the full bridge inverters having a positive node and a negative node, each of the full bridge inverters having a voltage supporting device electrically connected in a parallel relationship between the positive node and the negative node; at least one cascade inverter phase, each of the cascade inverter phases having a plurality of the full bridge inverters, each of the cascade inverter phases having a consistent number of the full bridge inverters with respect to each phase, each of the full bridge inverters in each cascade inverter phase interconnected in a series relationship with the secondary node of one of the full bridge inverters connected to the primary node of another full bridge inverter, the series interconnection defining a first full bridge inverter and a last full bridge inverter, each of the phases having an input node at the primary node of the first full bridge inverter and an output node at the secondary node of the last full bridge inverter; a control means connected in an operable relationship with each of the full bridge inverters to emit a square wave signal for a prescribed period therefrom; whereby, a nearly sinusoidal voltage waveform approximation is generated by the controlled, alternate activation and deactivation of the full bridge inverters by the control means.

In accordance with another aspect of the present invention, the multiple voltage source inverter may be configured in either a wye-connected or a delta-connected embodiment to address the requirements of multiple phase systems.

Yet another aspect of the present invention provides a method for inverting a plurality of DC voltage signals to approximate a sinsusiodal voltage waveform comprising the steps of detecting the DC voltage levels of a plurality of DC voltage sources; averaging the DC voltage levels; comparing the average with a reference DC voltage; generating a first error signal from the comparison of the average with a reference DC voltage; comparing the average with the detected DC voltage levels; generating a second error signal from the comparison of the average with the detected DC voltage levels; generating a phase shift offset signal from the second error signal; generating an average phase shift signal from the first error signal; summing the phase shift offset signal and the average phase shift signal; detecting an AC line voltage having a period; generating a phase reference signal directly related to the period of the AC line voltage; generating a plurality of firing reference signals for a plurality of full bridge inverters using the phase reference signal and the sum of the phase shift offset signal and the average phase shift signal; determining a modulation index; providing a reference table for the modulation index; generating a plurality of firing angle signals for the plurality of full bridge inverters using the firing reference signal and the reference table; whereby, the alternate activation of a plurality of gate turnoff devices in the full bridge inverters may be controlled to construct an output voltage waveform having a sinusoidal approximation for use by an AC load.

For a better understanding of the present invention, together with other and further objects, advantages and capabilities thereof, reference is made to the following disclosure and appended claims in connection with the above-described drawings.

DETAILED DESCRIPTION OF THE INVENTION

Figure 1:
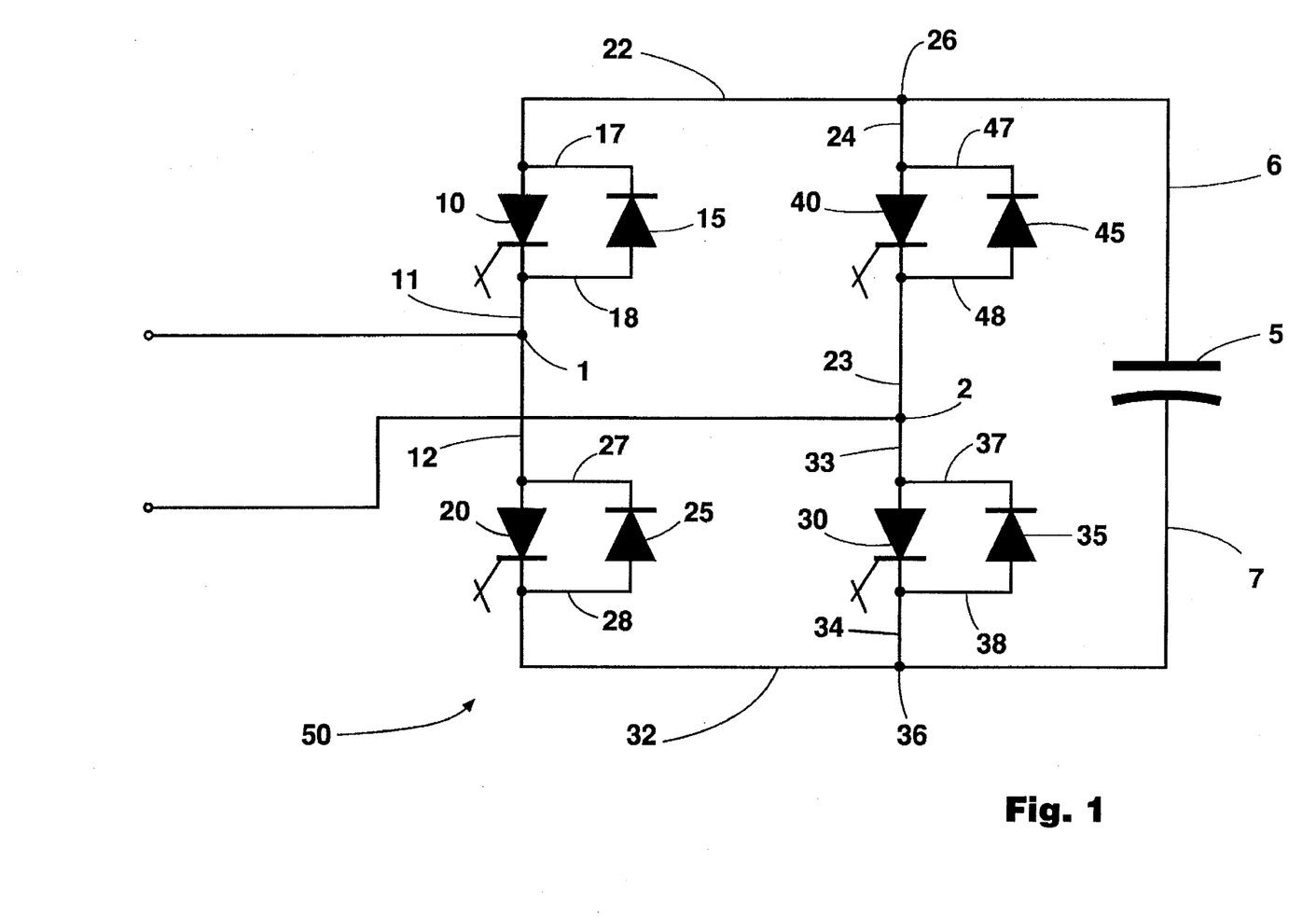
FIG. 1 is a schematic representation of a full bridge inverter.

Referring now in detail to the drawings wherein like parts are designated by like reference numerals throughout, there is illustrated in FIG. 1 a schematic representation showing the primary building block of the preferred embodiment of the apparatus of the present invention, a single-phase, full-bridge inverter (FBI) unit 50. A FBI unit comprises a primary node 1 and a secondary node 2 and an inverting means therebetween. The inverting means comprises four switching means further comprising gate turn-off devices 10, 20, 30 and 40 and anti-parallel diodes 15, 25, 35 and 45 connected in an operable, oppositely biased, parallel relationship by conductors 17, 18, 27, 28, 37, 38, 47 and 48, respectively. The gate turn-off devices may be any of the components capable of switching such as gate turn-off thyristors, insulated gate bipolar transistors, power MOSFETs, MOSFET controlled thyristors, bipolar junction transistors, static induction transistors, static induction thyristors or MOSFET turn-off thyristors. The first switching means is connected to the second switching means by conductors 22 and 24 through positive node 26. The second and third switching means are connected by conductors 23 and 33 through secondary node 2. The third and fourth switching means are connected by conductors 32 and 34 through negative node 36. The first and fourth switching means are connected by conductors 11 and 12 through primary node 1. A voltage supporting device 5, most commonly a capacitor, is connected between positive node 26 and negative node 36 by conductors 6 and 7, respectively. The voltage supporting device 5 may be any device, such as a DC voltage source or a capacitor, capable of maintaining a DC voltage for a sufficient period of time.

The FBI unit 50 can generate three level outputs; $+V_{DC}$, 0 and $-V_{DC}$ at the respective primary node 1. This is permitted by connecting the DC source 5 to the AC side of the FBI unit 50 via the four switching devices 10, 20, 30 and 40. Each switching device 10, 20, 30 and 40 is switched, wherein switching is defined by the activation and deactivation of the respective switching device, only once per power line cycle in an alternating fashion commonly known to one of ordinary skill in the art to produce the $+V_{DC}$, 0 and $-V_{DC}$ output voltages across the primary node 1 and the secondary node 2. The switching action is generally controlled by an external control means using either analog or digital control signals in a manner commonly known to one of ordinary skill in the art.

SINGLE-PHASE EMBODIMENT

Figure 2:
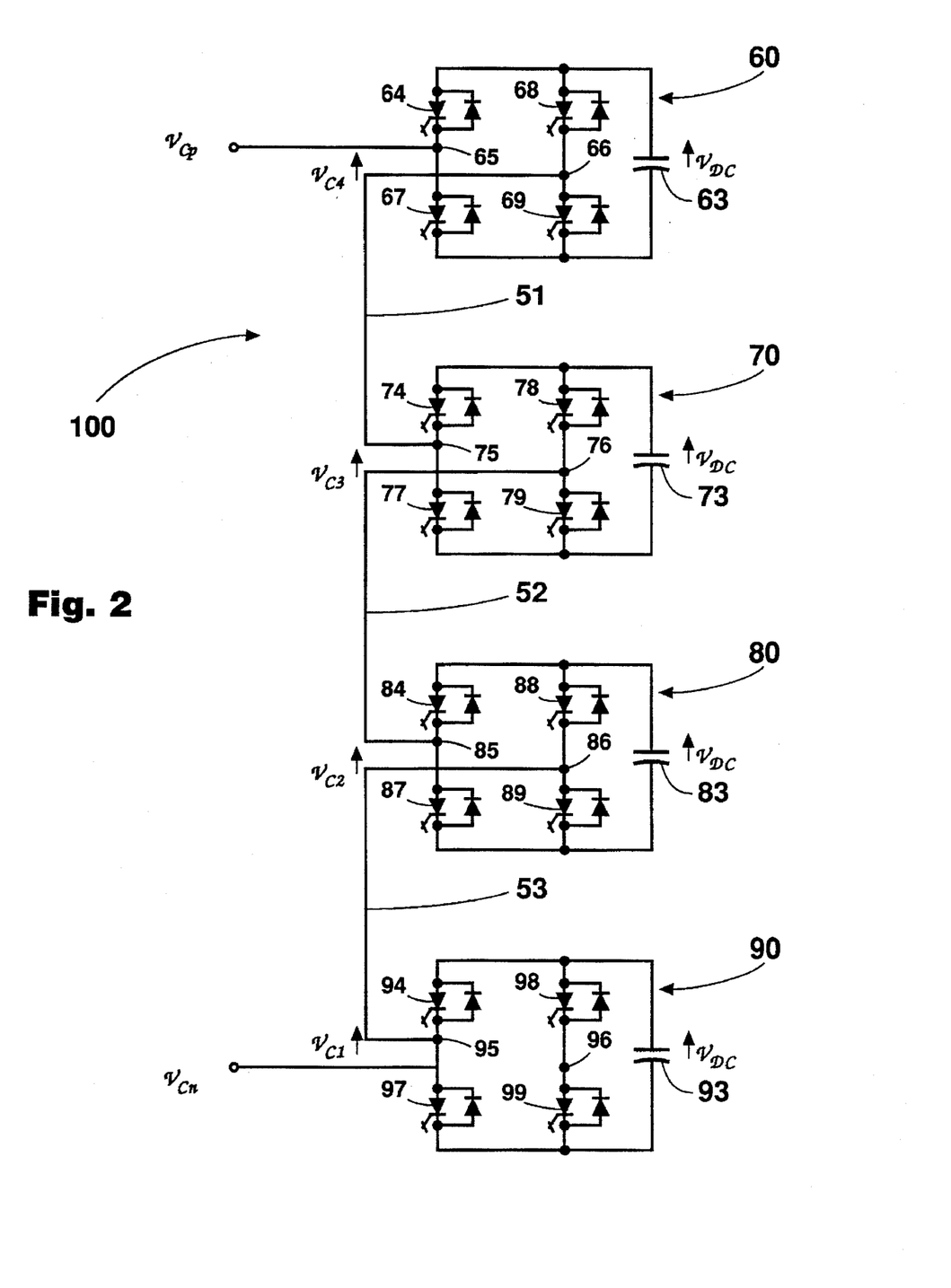
FIG. 2 is a schematic representation of the single-phase embodiment of the multilevel DC voltage source inverter.

FIG. 2 shows the single-phase embodiment 100 of the multilevel cascade inverter having separate DC voltage sources. The single-phase embodiment 100 comprises n FBI units 60, 70, 80 and 90 wherein n is determined by:

$$n = \frac{(M-1)}{2} \qquad \text{(Eq. 1)}$$

wherein M is the number of output voltage levels generated by the multilevel cascade inverter during a half fundamental cycle.

FBI units 60 and 70 are interconnected between primary node 75 and secondary node 66 by conductor 51. FBI units 70 and 80 are interconnected between primary node 85 and secondary node 76 by conductor 52. FBI units 80 and 90 are interconnected between primary node 95 and secondary node 86 by conductor 53. The primary node 65 of the first FBI unit 60 in the multilevel cascade inverter functions as the output of the cascade inverter single-phase embodiment 100. The secondary node 96 of the last FBI unit 90 in the multilevel cascade inverter functions as the reference of the cascade inverter single-phase embodiment 100. The FBI units are provided with separate DC voltage sources 63, 73, 83 and 93.

Figure 3:
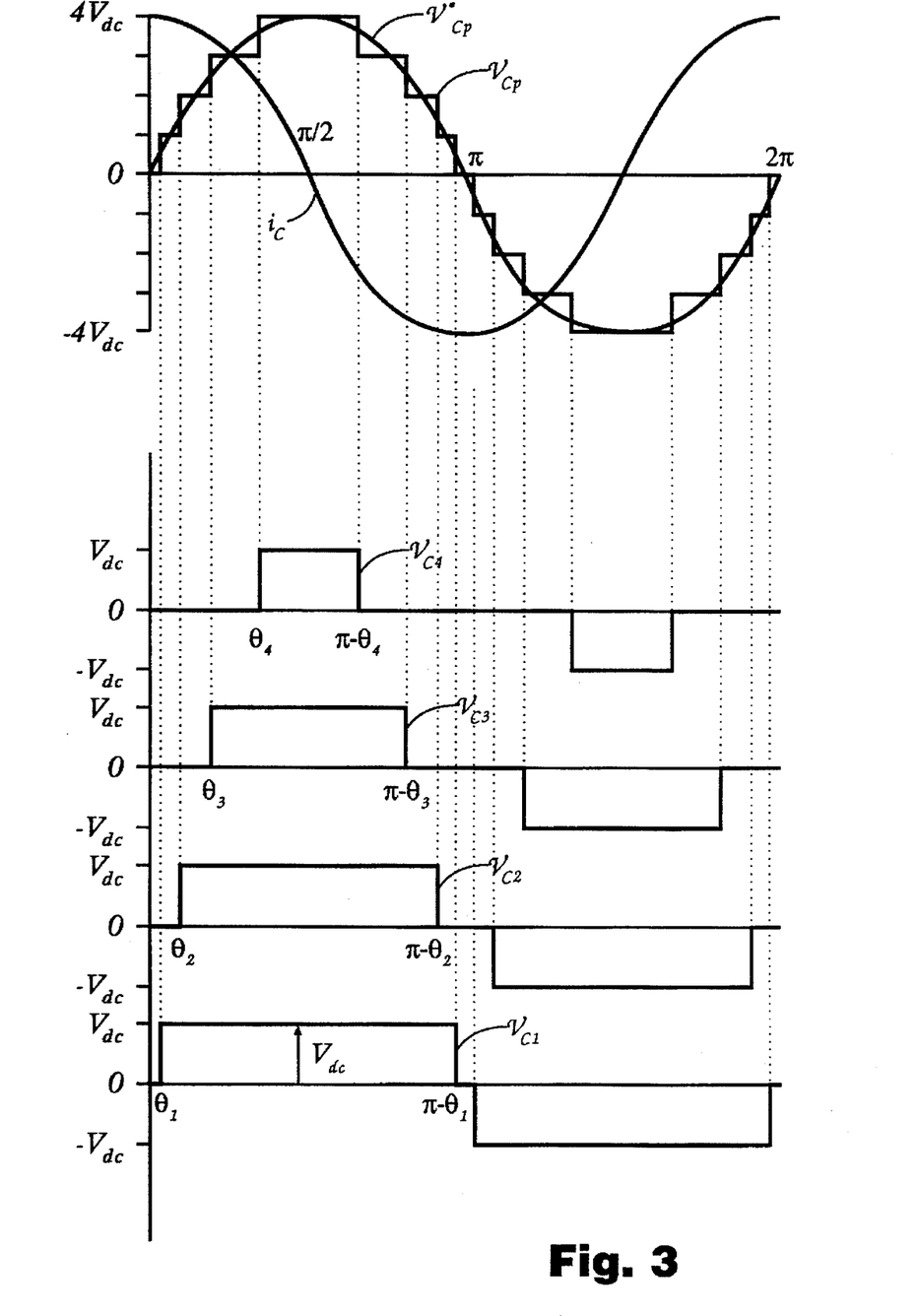
FIG. 3 is a graphical representation of the output voltage waveforms with respect to the input signals, $v_{C1}$, $v_{C2}$, $v_{C3}$ and $v_{C4}$.

The schematic represented in FIG. 2 shows the M level, single phase cascade inverter 100 wherein M=9. FIG. 3 shows the waveform response of the circuit shown in FIG. 2 wherein a DC voltage input was injected by independent voltage sources 63, 73, 83 and 93. The waveform $v_{Cp}$ is measured between node 65 and node 96 using the output waveforms shown as $v_{C1}$, $v_{C2}$, $v_{C3}$ and $v_{C4}$, injected by 60, 70, 80 and 90, respectively. It is obvious to one of ordinary skill in the relevant art that $v_{Cp}$ as shown in FIG. 3 with reference to $v_{Cn}$ may be accurately described by:

$$v_{Cp} = v_{C1} + v_{C2} + v_{C3} + v_{C4} \qquad \text{(Eq. 2)}$$

wherein $v_{C1}$, $v_{C2}$, $v_{C3}$ and $v_{C4}$ are the respective voltage output levels of the each FBI unit in the single phase cascade inverter 100 as shown in FIG. 2.

THREE-PHASE, WYE CONNECTED EMBODIMENT

Figure 4:
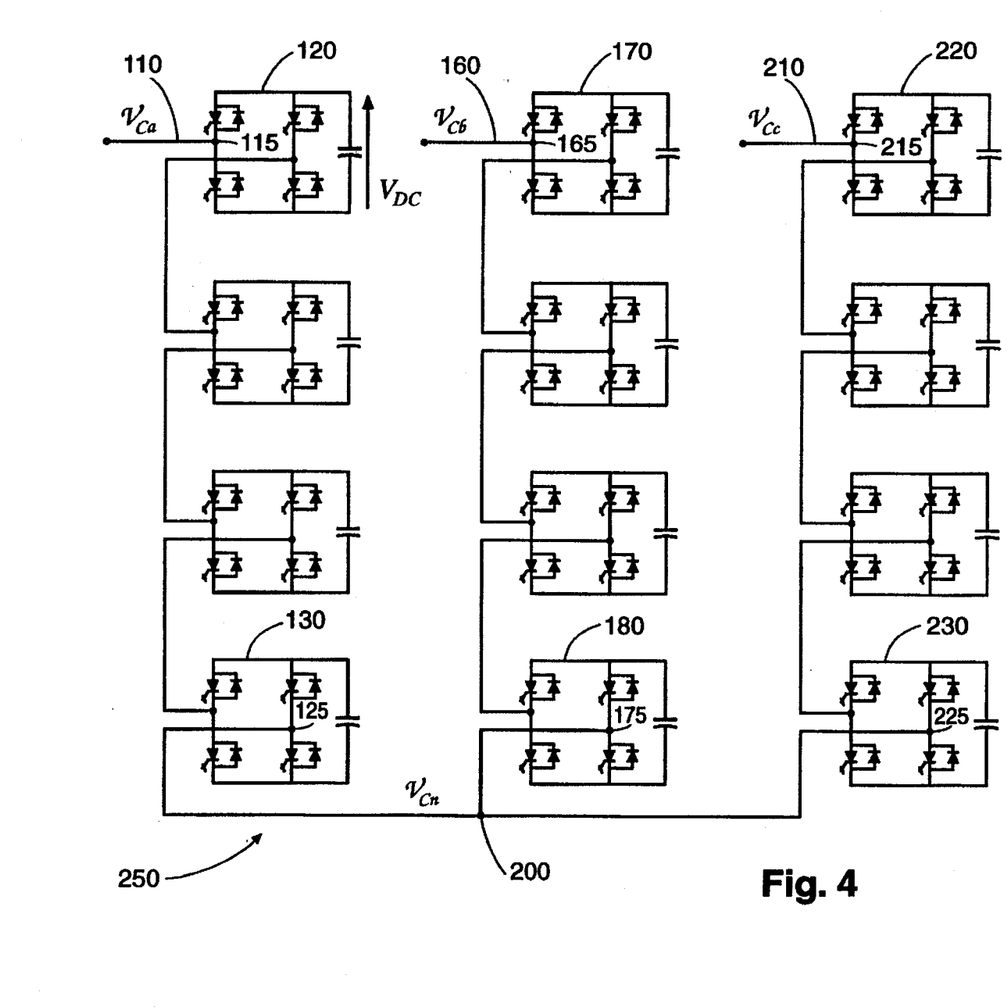
FIG. 4 is a schematic representation of the multiphase wye connected embodiment of the multilevel voltage source inverter.

FIG. 4 shows the three-phase, wye connected embodiment 250 of the multilevel cascade inverter having separate DC voltage sources. The wye connected embodiment 250 comprises three distinct phases 110, 160 and 210, each phase having a multilevel cascade inverter comprising a plurality of FBI units. Each multilevel cascade is constructed as previously described in the single-phase embodiment discussion. The primary nodes 115, 165 and 215 of the first FBI units 120, 170 and 220 in each phase of the multilevel cascade is the phase output for each of the respective phases 110, 160 and 210. The secondary nodes 125, 175 and 225 of the last FBI units 130, 180 and 230 in each phase of the multilevel cascade are electrically connected to create a common node 200 therebetween.

The operative aspects of the three-phase, wye connected embodiment of the multilevel cascade inverter having separate DC sources are identical to the single-phase embodiment as previously discussed.

THREE-PHASE, DELTA CONNECTED EMBODIMENT

Figure 5:
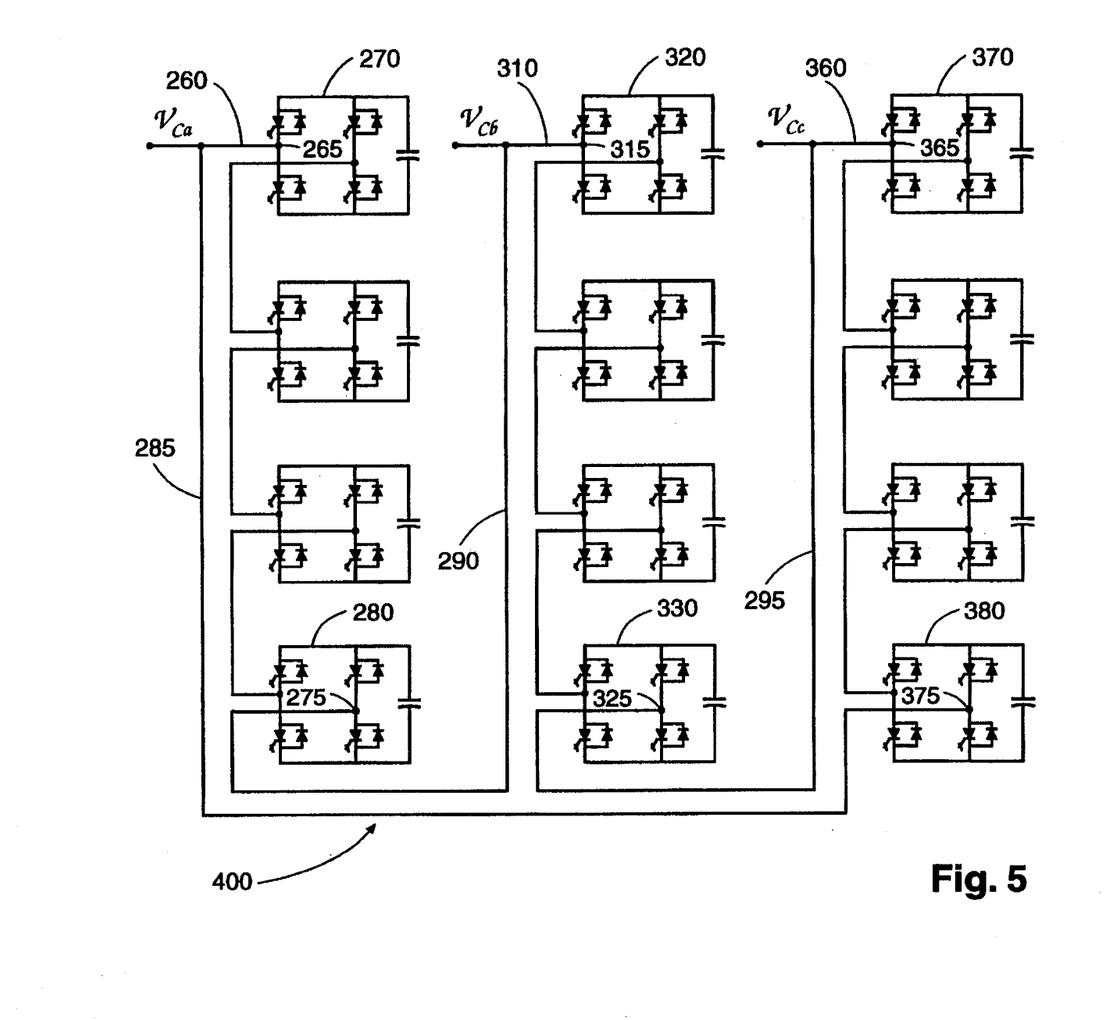
FIG. 5 is a schematic representation of the multiphase delta connected embodiment of the multilevel voltage source inverter.

FIG. 5 shows the three-phase, delta connected embodiment 400 of the multilevel cascade inverter having separate DC voltage sources. The delta connected embodiment 400 comprises three distinct phases 260, 310 and 360, each phase having a multilevel cascade inverter comprising a plurality of FBI units. Each multilevel cascade is constructed as previously described in the single-phase embodiment. The primary nodes 265, 315 and 365 of the first FBI units 270, 320 and 370 in each phase of the multilevel cascade is the phase output for the respective phases 260, 310 and 360. The primary node 265 of FBI unit 270 is electrically connected to the secondary node 375 of the FBI unit 380 by conductor 285. The primary node 315 of FBI unit 320 is electrically connected to the secondary node 275 of the FBI unit 280 by conductor 290. The primary node 365 of FBI unit 370 is electrically connected to the secondary node 325 of the FBI unit 330 by conductor 295.

The operative aspects of the three-phase, delta connected embodiment of the multilevel cascade inverter having separate DC sources are identical to the single-phase embodiment as previously discussed.

SYSTEM CONFIGURATION AND CONTROL SCHEME FOR SVGs

Figure 6:
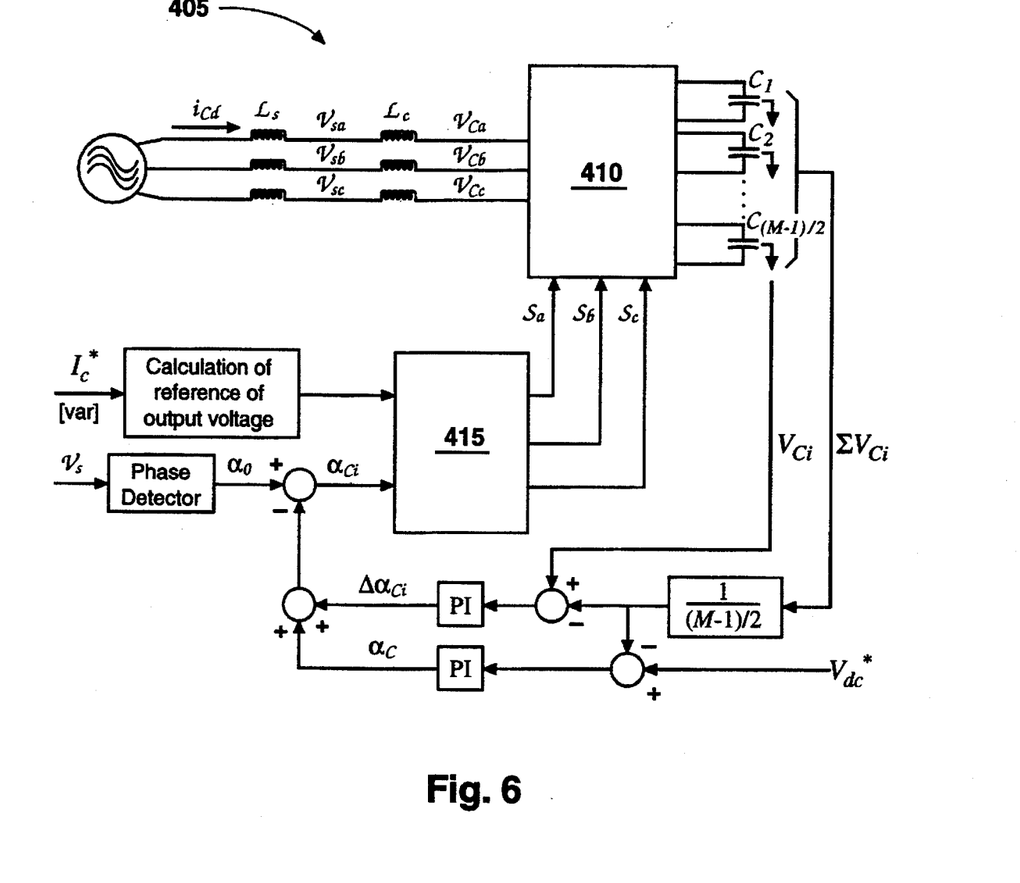
FIG. 6 is a control block diagram of a static VAR generatorcompensation system employing a three-phase multilevel cascade inverter having separate DC sources.

FIG. 6 shows a control block diagram of a SVG 405 employing a three-phase multilevel cascade inverter 410 having separate DC sources as described herein. In FIG. 6, $v_s$ represents the source voltage, $L_s$ the source impedance and $L_c$ the inverter interface impedance, respectively. The multilevel cascade inverter discussed in this example will be the inverter previously discussed for the multilevel, wye connected embodiment 250. Variations therefrom utilizing other embodiments previously discussed will be obvious to one of ordinary skill in the relevant art. The switching pattern table 415 contains switching timing data for the multilevel cascade inverter 410 to generate the desired phase output voltage as shown in FIG. 3. The switching angles, $\theta_i$, where i=1, 2, (M–1)/2, are calculated off-line by conventional methods to minimize harmonics for each modulation index, MI, described by:

$$MI = \frac{V_C^*}{V_{Cmax}} \quad \text{(Eq. 3)}$$

wherein $V_C^*$ is the amplitude command of the inverter output phase voltage and $V_{Cmax}$ is the maximum obtainable amplitude, i.e., the amplitude of the phase voltage when all switching angles, $\theta_i$, are equal to zero.

Since the phase current, $i_{Ca}$, graphically displayed in FIG. 3 is either leading or lagging the phase voltage $v_{Can}$ by 90 degrees, the average charge to each DC voltage supporting device is equal to zero over every half line cycle. From FIG. 3, the average charge to each DC voltage supporting device, $Q_i$, over half cycle 0 to $\pi$ can be expressed as:

$$Q_i = \int_{\theta_i}^{\pi - \theta_i} I\cos\theta d\theta = 0 \quad \text{(Eq. 4)}$$

where, i=1, 2, 3 and 4 with respect to FIG. 4 and $\theta_i$ to $\pi-\theta_i$ represents the interval of connecting the DC voltage supporting device to the AC side of the FBI unit and I is the magnitude of the line current $i_C$. This configuration allows balanced DC voltages on each DC voltage supporting device in each FBI unit of each phase of the multilevel, wye connected cascade inverter due to equal charge and discharge of the voltage supporting devices.

As previously discussed, the average charge to each DC voltage supporting device will be zero if each FBI unit output voltage, $v_{C1}$, is exactly 90 degrees out-of-phase with the line current, $i_C$, as shown in FIG. 3. Therefore the DC voltage supporting device, in this case a capacitor, sees no real power. Even without real power imparted on the respective capacitors, the capacitor voltage can not be maintained due to switching device losses and capacitor losses. Therefore to maintain each DC capacitor voltage, the inverter must be controlled to allow some real power to influence the DC capacitors to maintain the DC command voltage $V_{DC}^*$.

The control block diagram shown in FIG. 6 includes two distinct control loops. The outer loop, defined by the influence of the DC command voltage $V_{DC}^*$, is to control total power flow to the FBI units, whereas the inner loop, defined by the feed back from the individual FBI units, is to offset power flow to the individual FBI units.

Figure 7A:
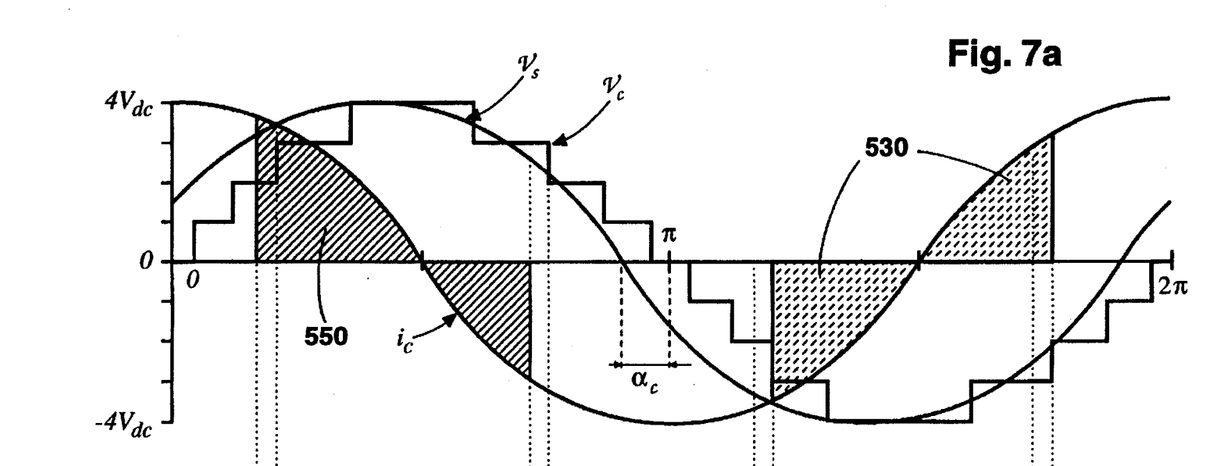
FIG. 7a is a waveform representation wherein $v_s$ is the source voltage, $i_C$ is the current flowing into the inverter and $v_C$ is the inverter output voltage of the multilevel voltage source inverter used with the control system of FIG. 6.
Figure 7B:
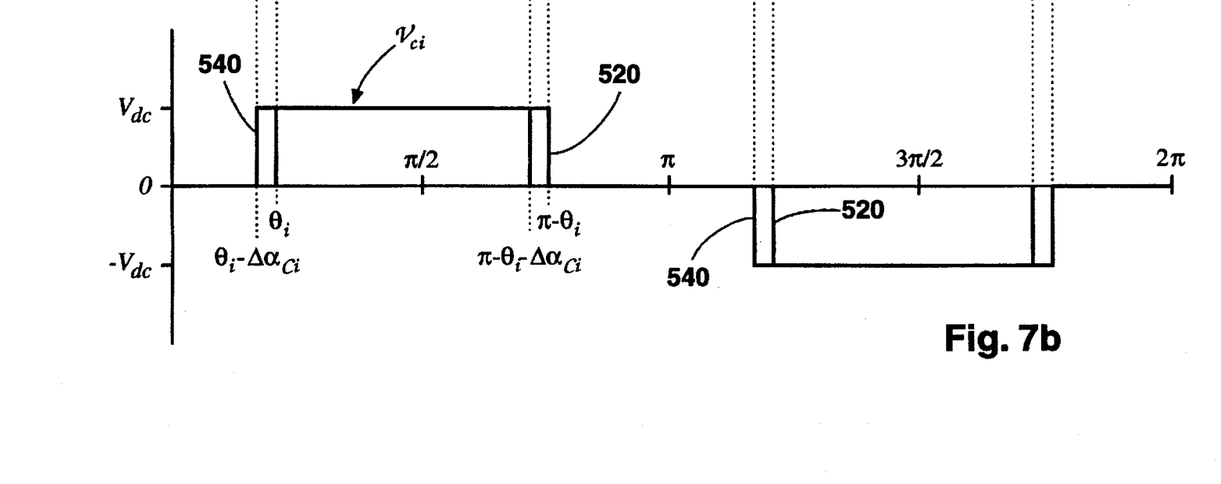
FIG. 7b is a waverform representation wherein $v_{Ci}$ is the input wavform, shifted ahead by $\Delta\alpha_{Ci}$, a full bridge inverter of the multilevel voltage source inverter used with the control system of FIG. 6.

The control principle can be explained with the assistance of FIGS. 7a and 7b. In FIG. 7a, $v_s$ is the source voltage, $i_C$ is the current flowing into the inverter and $v_C$ is the inverter output voltage. If $v_C$ is controlled so that $v_C$ lags $v_s$ by $\alpha_C$, then the total real power flowing into the inverter, $P_i$, is:

$$P_i = \frac{V_S V_C \sin \alpha_c}{X_{Lc}} \quad \text{(Eq. 5)}$$

where $X_{Lc}$ is the inductance of the interface inductor $L_C$. Since the devices, e.g. capacitors, diodes, etc., used in the construction of the multilevel cascade inverter 410 are not ideal and therefore have varying tolerances, each DC capacitor voltage can not be exactly balanced using the outer loop only. Referring to FIGS. 7a and 7b, if FBI unit I output voltage, $v_{Ci}$, is as shown by trace 520, then the average charge into the DC capacitor over each half cycle, the second shaded area 530, will nearly equal zero. However, if $v_{Ci}$ is shifted ahead by $\Delta\alpha_{Ci}$ as shown by trace 540, the charge shown in area 550 can be expressed as:

$$Q_i = \int_{\theta_i - \Delta\theta_{ci}}^{\pi - \theta_i - \Delta\alpha_{ci}} I\cos\theta d\theta = 2I\cos\theta_i \sin\Delta\alpha_{ci} \quad \text{(Eq. 6)}$$

which is proportional to $\Delta\alpha_{Ci}$ when $\Delta\alpha_{Ci}$ is small. Therefore, each FBI unit DC capacitor voltage can be actively controlled by slightly shifting the switching pattern. In the case for high voltage, high power applications, total power loss for the multilevel cascade inverter 410 is typically less than one percent.

The method used to control the automatic switching of the FBIs may be best described with reference to FIG. 6. First, the voltage supporting device DC voltage levels, $V_{Ci}$, are detected, summed and then averaged. The average DC voltage level is then compared with a system reference DC voltage, $V_{dc}^*$. Using a proportional integrator, an average phase shift signal, $\alpha_C$, is generated from a first error signal describing the comparison between the average DC voltage level and the system reference DC voltage, $V_{dc}^*$. The average DC voltage level is also compared with the respective detected DC voltage levels, $V_{Ci}$. Using a proportional integrator, a phase shift offset signal, $\Delta\alpha_{Ci}$, is generated from a second error signal describing the comparison between the average DC voltage level and the respective detected DC voltage levels, $V_{Ci}$. The phase shift offset signal, $\Delta\alpha_{Ci}$, and said average phase shift signal, $\alpha_C$, are then summed. An AC line voltage, $V_S$, having a period is detected from which a phase reference signal, $\alpha_0$, directly related to the period of the AC line voltage, $V_S$, is developed by comparison with the sum of the phase shift offset signal signal, $\Delta\alpha_{Ci}$, and said average phase shift signal, $\alpha_C$. Multiple firing reference signals, $\alpha_{Ci}$, for the FBIs are generated by comparing the phase reference signal, $\alpha_0$, and the sum of phase shift offset signal, $\Delta\alpha_{Ci}$, and the average phase shift signal, $\alpha_C$. A modulation index, MI, may be selected by the user for which a corresponding reference table is provided. Firing angle signals are generated for the FBIs using the firing reference signal in view of the reference table for the given modulation index, MI, whereby, the alternate activation of a plurality of gate turn-off devices in the FBIs may be controlled to construct an output voltage waveform having a sinusoidal approximation for use by an AC load.

REQUIRED CAPACITANCE OF DC CAPACITANCE

Since each phase of the multilevel cascade inverter described herein has independent DC capacitors, the required capacitance calculation of each FBI unit DC capacitor is straightforward. With reference to FIG. 3, the required capacitance, $C_i$, can be expressed as:

$$C_i = \frac{\Delta Q_i}{\Delta V_{dc}} = \frac{\int_{\theta_i(t)}^{T/4} \sqrt{2} I\cos\omega t \, dt}{2\epsilon V_{dc}} = \frac{\sqrt{2} I(1 - \sin\theta_i)}{2\omega \epsilon V_{dc}} \quad \text{(Eq. 7)}$$

where I is the current rating of the inverter, $\epsilon$ is the given regulation factor of the DC voltage and $\theta_i$ is the switching timing angle of FBI unit I as shown in FIG. 3. Note that:

$$I = I_{SVG} \quad \text{(Eq. 8)}$$

for the wye connected embodiment and:

$$I = \frac{I_{SVG}}{\sqrt{3}} \quad \text{(Eq. 9)}$$

for the delta connected embodiment. The total required capacitance for a three-phase M-level converter, C, may be expressed as $$C = 3 \sum_{i=1}^{(M-1)/2} C_i \quad \text{(Eq. 10)}$$

As previously discussed, $\theta_i$ is calculated for each MI value. To generate $\pm Q_{VAR}$ reactive power, MI would change between $MI_{min}$ and $MI_{max}$, wherein the SVG produces $+Q_{VAR}$ when $MI=MI_{max}$ and produces $-Q_{VAR}$ for $MI=MI_{min}$. For $MI=MI_{max}$, $\theta_i$ becomes minimum and for $MI=MI_{min}$, $\theta_i$ becomes maximum. Therefore, $\theta_{i\,at\,MI=MImax}$ may be used in equation 6 to calculate the required capacitance to maintain the DC voltage ripple below the given regulation, $\epsilon$, for all loads.

EXAMPLE

A SVG system as shown in FIG. 6 having an 11-level wye-connected cascade inverter with 5 FBI units per phase was constructed having the system parameters shown in Table 1. The switching timing angles, $\theta_i$, wherein i=1, 2. 3, 4, 5), shown in Table 2, were specifically calculated for minimizing voltage harmonics, below the 25th order, and stored in the switching pattern table 415 shown in FIG. 6.

TABLE 1

| System Parameters of Experimental Prototype | |
| --- | --- |
| System Parameter | Value |
| Source Voltage Rating, $V_s$ | 240 V |
| VAR Rating, $Q_{VAR}$ | ± 1 kVAR |
| Current Rating, I | 2.4 A |
| DC Voltage, $V_{dc}$ | 40 V |
| DC Voltage Regulation, $\epsilon$ | ±5% |
| Interface Inductance, $L_C$ | 20% (32 mH) |
| Source Impedance, $L_S$ | 3% |
| Modulation Index, $MI_{min}$, $MI_{max}$ | 0.615, 0.915 |

TABLE 2

| Switching Pattern Table of 11-Level Cascade Inverter | | | | | |
| --- | --- | --- | --- | --- | --- |
| Modulation Index | Switching Timing Angles (rad.) | | | | |
| MI | $\theta_1$ | $\theta_2$ | $\theta_3$ | $\theta_4$ | $\theta_5$ |
| 0.615 | 0.4353 | 0.7274 | 0.8795 | 1.0665 | 1.2655 |
| ... | ... | ... | ... | ... | ... |
| 0.915 | 0.0687 | 0.1595 | 0.3124 | 0.4978 | 0.7077 |

Using the parameters of Tables 1 and 2 and Equations 7 and 10, the following values may be calculated:

$C_1$=2.1 mF;

$C_2$=1.89 mF;

$C_3$=1.56 mF;

$C_4$=1.18 mF; and $C_5$=0.79 mF.

The total capacitance is calculated:

C=22.56 mF.

As the number of inverter cascade levels is increased for high voltage applications, the required capacitance of the cascade inverter, C, will approach that of a conventional multipulse inverter, $C_{dc}$, wherein the ratio $C/C_{dc}$ will approach one as a limit.

EXAMPLE

An SVG system using the delta connected embodiment of a 21-level cascade inverter having 10 FBI units per phase is connected directly to a 13 kV distribution system. The SVG capacity is ±50 MVAR. $I_{SVG}$=2.22 kA, I=1.282 kA, $L_C$=3%, $MI_{min}$=0.6385, $MI_{max}$=0.8054, $V_{dc}$=2 kV and $\epsilon$=±5%. At the rated load of +50 MVAR, $[\theta_1, \theta_2, \ldots \theta_i]$=[0.0334, 0.1840, 0.2491, 0.3469, 0.4275, 0.5381, 0.6692, 0.8539, 0.9840, 1.1613] rad. For this SVG system, the total required capacitance of DC capacitors can be calculated as C=370 mF. The required capacitance for a comparable conventional multipulse inverter will be $C_{dc}$=332 mF. Therefore, the ratio $C/C_{dc}$ approached unity at 1.11.

SIMULATION AND EXPERIMENTAL RESULTS

To demonstrate the validity of the multilevel cascade inverter described herein, an SVG prototype using an 11-level wye-connected cascade inverter was built. FIG. 6 and Tables 1 and 2 show the experimental configuration and the corresponding parameters. For the DC voltage control loops, only the voltages of $C_1$ and $C_5$ of phase "a" are detected and controlled directly. The control voltages for $C_2$, $C_3$ and $C_4$ uses interpolating values of $\Delta\alpha_{C1}$ and $\Delta\alpha_{C5}$.

Figure 8:
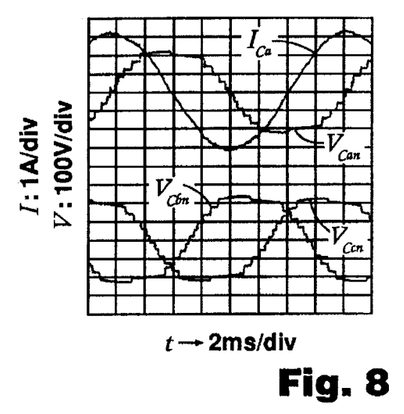
FIG. 8 contains the experimental voltage waveforms showing the phase voltage results of the inverter and the line current waveform in the system of FIG. 6 at +1 kVAR output.
Figure 9:
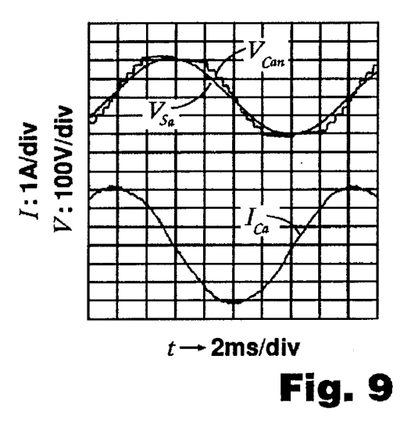
FIG. 9 contains the experimental voltage waveforms showing the phase voltages of the AC source and of the inverter and the line current waveform in the system of FIG. 6 at +1 kVAR output.
Figure 10:
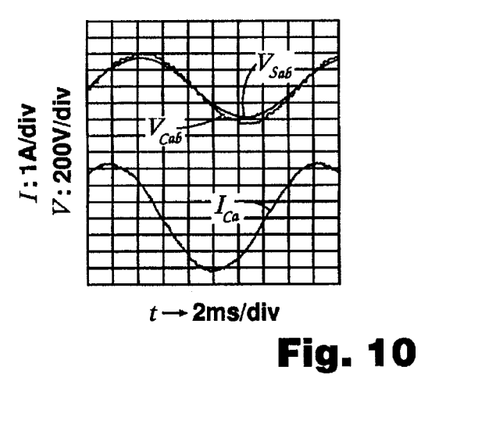
FIG. 10 contains the experimental voltage waveforms showing the line-to-line voltages of the AC source and of the inverter and the line current waveform of in the system of FIG. 6 at +1 kVAR output.
Figure 11:
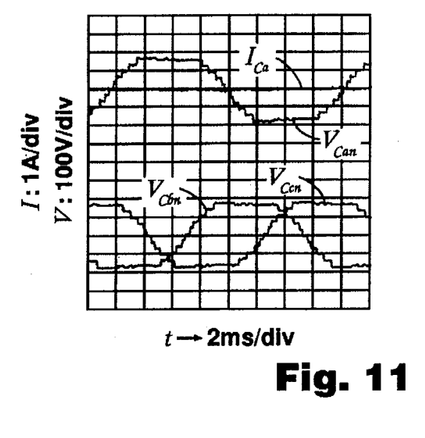
FIG. 11 contains the experimental voltage waveforms showing the phase voltages of the inverter and the line current in the system of FIG. 6 at 0 kVAR output.
Figure 12:
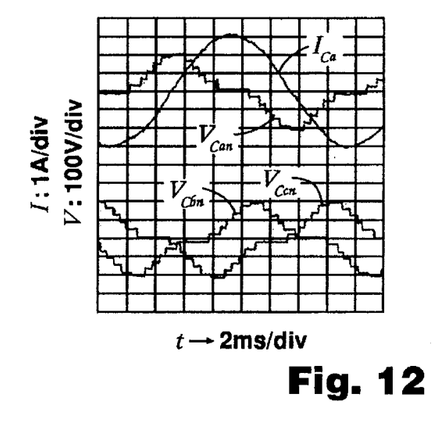
FIG. 12 contains the experimental voltage waveforms showing the phase voltages of the inverter and the line current in the system of FIG. 6 at −1 kVAR output.
Figure 13:
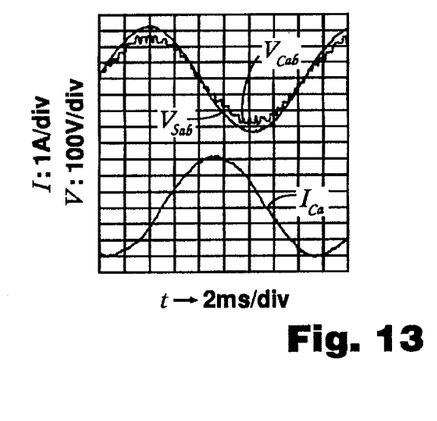
FIG. 13 contains the experimental voltage waveforms showing the line-to-line voltages of the AC source and the inverter and the line current in the system of FIG. 6 at −1 kVAR output.

FIGS. 8, 9 and 10 show the experimental results when the SVG generates +1 kVAR reactive power. FIG. 11 shows experimental results at zero VAR output. FIGS. 12 and 13 show the case of generating −1 kVAR reactive power.

From FIGS. 8, 9 and 10 it is demonstrated that the inverter output phase voltage is an 11-level steplike waveform and the line-to-line voltage is a 21-level steplike waveform over a half cycle. Each step has the same span, which means the voltage of each DC capacitor is well controlled and balanced. The DC voltage command, $V_{dc}^*$, was 40 V, and the modulation index was the maximum, MI=0.915, in this case.

It is well known to those of ordinary skill in the art that either the modulation index or the DC voltage or both may be controlled to regulate the output voltage. FIG. 12 shows the experimental waveforms to generate zero reactive power or zero current with a different DC voltage and the same modulation index as that of FIGS. 8, 9 and 10. In this case, the DC voltage of each DC capacitor was controlled to be 34 V, $V_{dc}^*$=34 V.

In FIGS. 12 and 13, M1=0.615 and $V_{dc}^*$=40 V. The inverter generates −1 kVAR of reactive power, that is, the current, $I_{Ca}$, is lagging the voltage, $V_{Sa}$, by 90 degrees.

These experimental results show that the voltages of the DC capacitors are well balanced. The results also show that pure sinusoidal current has been obtained with only 20% impedance on the AC side of the inverter. Using the delta-connected embodiment of the cascade inverter can compensate for a balanced or unbalanced three-phase load reactive power.

APPLICATIONS FOR CASCADE INVERTERS WITH SEPARATE DC SOURCES

Figure 14:
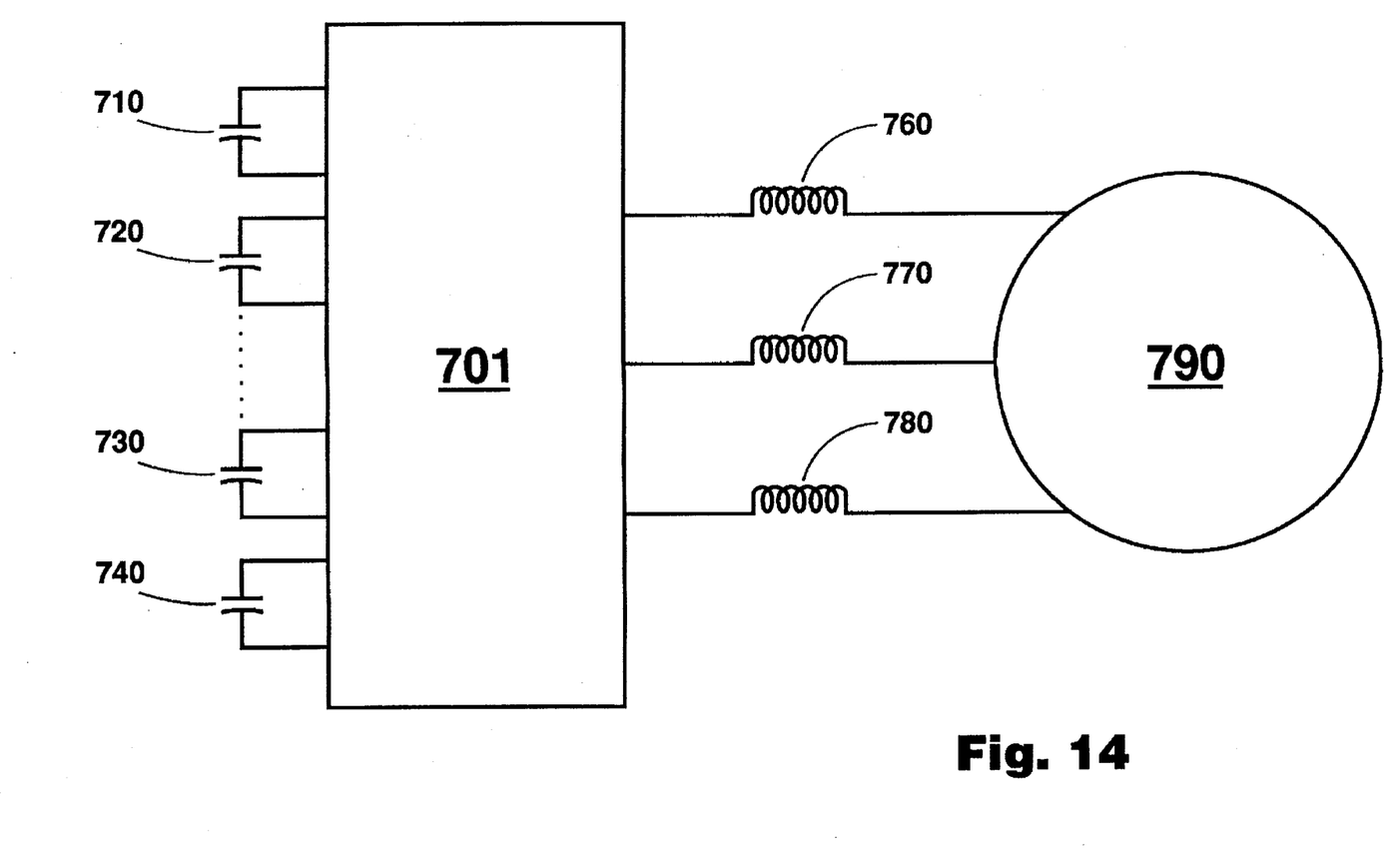
FIG. 14 is a block diagram of a typical application of a multiphase, multilevel cascade inverter with separate DC sources connected to an AC load.

Applications for the multilevel cascade voltage source inverters with separate DC sources are not limited to static VAR compensation or power system applications. These multilevel cascade inverters may also be used for providing clean AC power to AC loads with separate DC sources. FIG. 14 shows a circuit diagram having a multiphase, multilevel cascade inverter with separate DC sources 701 connected to an AC load 790 through smoothing inductors 760, 770 and 780. Typically, this circuit contains a set of separate DC voltage sources 710, 720, 730 and 740 which feed through a multilevel cascade inverter 701 to produce a step-like AC output voltage waveform. The voltage is then filtered by small smoothing inductors 760, 770 and 780 to produce a pure sinusoidal wave for an AC load 790. If the specific application is for AC motors, then the smoothing inductors 760, 770 and 780 may be removed from the circuit because the load motor has sufficient inductance to filter the input current. Examples of typical loads comprise motor drives, actuators and appliances. The DC voltage sources 710, 720, 730 and 740 may be obtained from any type conventional voltage source such as batteries, capacitors, photocells, fuel cells and biomass.

While there has been shown and described what is at present considered the preferred embodiments of the invention, it will be obvious to those skilled in the art that various changes and modifications can be made therein without departing from the scope of the invention deformed by the appended claims.

What is claimed is:

1. A multiple DC voltage source inverter for connecting to an AC power system, comprising:
    a. a plurality of full bridge inverters having a primary node and a secondary node, each of said full bridge inverters having a positive node and a negative node, each of said full bridge inverters having a voltage supporting device electrically connected in a parallel relationship between said positive node and said negative node;
    b. at least one cascade inverter phase, each cascade inverter phase having a plurality of said full bridge inverters, each cascade inverter phase having a consistent number of said full bridge inverters with respect to each phase, each of said full bridge inverters in each cascade inverter phase interconnected in a series relationship with said secondary node of one of said full bridge inverters connected to said primary node of another full bridge inverter, said series interconnection defining a first full bridge inverter and a last full bridge inverter, each phase having an input node at said primary node of said first full bridge inverter and an output node at said secondary node of said last full bridge inverter;
    c. a control means connected in an operable relationship with each of said full bridge inverters to emit a square wave signal for a prescribed period therefrom;
whereby, a nearly sinusoidal voltage waveform approximation is generated by the controlled, alternate activation and deactivation of said full bridge inverters by said control means.

2. A multiple DC voltage source inverter for connecting to an AC power system as described in claim 1 having three cascade inverter phases.

3. A multiple DC voltage source inverter for connecting to an AC power system as described in claim 2 having a plurality of phase connectors, one of said phase connectors electrically connected between said input node of the first of said cascade inverter phases and said output node of the third of said cascade inverter phases, another of said phase connectors electrically connected between said input node of the third of said cascade inverter phases and said output node of the second of said cascade inverter phases, another of said phase connectors electrically connected between said input node of the second of said cascade inverter phases and said output node of the first of said cascade inverter phases.

4. A multiple DC voltage source inverter for connecting to an AC power system as described in claim 3 further comprising each of said full bridge inverters having a first switching pair and a second switching pair, each of said switching pairs having a plurality of switching means for controllably regulating electrical current flow, each of said switching means having a first end and a second end, said first switching pair having a plurality of switching means electrically connected at said first end at said positive node of said full bridge inverter, said second end of one of said switching means of said first switching pair electrically connected to said primary node, said second end of another of said switching means of said first switching pair electrically connected to said secondary node, said second switching pair having a plurality of switching means electrically connected at said second ends at said negative node of said full bridge inverter, said first end of one of said switching means of said second switching pair electrically connected to said primary node, said first end of another of said switching means of said second switching pair electrically connected to said secondary node.

5. A multiple DC voltage source inverter for connecting to an AC power system as described in claim 4 wherein said switching means comprises a gate turn-off device and an anti-parallel device connected in parallel and oppositely biased with respect to one another.

6. A multiple DC voltage source inverter for connecting to an AC power system as described in claim 5 wherein said gate turn-off device is a component selected from the group consisting of a gate turn-off thyristor, an insulated gate bipolar transistor, a power MOSFET, a MOSFET controlled thyristor, a bipolar junction transistor, a static induction transistor, a static induction thyristor and a MOSFET turn-off thyristor.

7. A multiple DC voltage source inverter for connecting to an AC power system as described in claim 5 said anti-parallel device is a diode.

8. A multiple DC voltage source inverter for connecting to an AC power system as described in claim 1 wherein each of said voltage supporting devices is a component selected from the group consisting of capacitors, fuel cells, photovoltaic cells and biomass cells.

9. A multiple DC voltage source inverter for connecting to an AC power system, comprising:
    a. a plurality of full bridge inverters having a primary node and a secondary node, each of said full bridge inverters having a positive node and a negative node, each of said full bridge inverters having a voltage supporting device electrically connected in a parallel relationship between said positive node and said negative node;
    b. a plurality of cascade inverter phases, each of said cascade inverter phases having a plurality of said full bridge inverters, each of said cascade inverter phases having a consistent number of said full bridge inverters with respect to each phase, each of said full bridge inverters in each cascade inverter phase interconnected in a series relationship with said secondary node of one of said full bridge inverters connected to said primary node of another full bridge inverter, said series interconnection defining a first full bridge inverter and a last full bridge inverter, each of said phases having an input node at said primary node of said first full bridge inverter and an output node at said secondary node of said last full bridge inverter;

c. a common node defined by the electrical interconnection of said output nodes of each of said cascade inverter phases; and d. a control means connected in an operable relationship with each of said full bridge inverters to emit a square wave signal for a prescribed period therefrom;

whereby, a nearly sinusoidal voltage waveform approximation is generated by the controlled, alternate activation and deactivation of said full bridge inverters by said control means.

10. A multiple DC voltage source inverter for connecting to an AC power system as described in claim 9 further comprising each of said full bridge inverters having a first switching pair and a second switching pair, each of said switching pairs having a plurality of switching means for controllably regulating electrical current flow, each of said switching means having a first end and a second end, said first switching pair having a plurality of switching means electrically connected at said first end at said positive node of said full bridge inverter, said second end of one of said switching means of said first switching pair electrically connected to said primary node, said second end of another of said switching means of said first switching pair electrically connected to said secondary node, said second switching pair having a plurality of switching means electrically connected at said second ends at said negative node of said full bridge inverter, said first end of one of said switching means of said second switching pair electrically connected to said primary node, said first end of another of said switching means of said second switching pair electrically connected to said secondary node.

11. A multiple DC voltage source inverter for connecting to an AC power system as described in claim 10 wherein said switching means comprises a gate turn-off device and an anti-parallel device connected in parallel and oppositely biased with respect to one another.

12. A multiple DC voltage source inverter for connecting to an AC power system as described in claim 11 wherein said gate turn-off device is a component selected from the group consisting of a gate turn-off thyristor, an insulated gate bipolar transistor, a power MOSFET, a MOSFET controlled thyristor, a bipolar junction transistor, a static induction transistor, a static induction thyristor and a MOSFET turn-off thyristor.

13. A multiple DC voltage source inverter for connecting to an AC power system as described in claim 11 said anti-parallel device is a diode.

14. A multiple DC voltage source inverter for connecting to an AC power system as described in claim 9 wherein each of said voltage supporting devices is a component selected from the group consisting of capacitors, fuel cells, photovoltaic cells and biomass cells.

15. A multiple DC voltage source inverter for connecting to a AC power system as described in claim 9 having three cascade inverter phases.

16. A method for inverting a plurality of DC voltage signals to approximate a sinsusiodal voltage waveform comprising the following steps:

a. detecting the DC voltage levels of a plurality of DC voltage sources;

b. averaging said DC voltage levels;

c. comparing said average with a reference DC voltage;

d. generating a first error signal from said comparison of said average with a reference DC voltage;

e. comparing said average with said detected DC voltage levels;

f. generating a second error signal from said comparison of said average with said detected DC voltage levels;

g. generating a phase shift offset signal from said second error signal;

h. generating an average phase shift signal from said first error signal;

i. summing said phase shift offset signal and said average phase shift signal;

j. detecting an AC line voltage having a period;

k. generating a phase reference signal directly related to said period of said AC line voltage;

l. generating a plurality of firing reference signals for a plurality of full bridge inverters using said phase reference signal and said sum of said phase shift offset signal and said average phase shift signal;

m. determining a modulation index;

n. providing a reference table for said modulation index;

o. generating a plurality of firing angle signals for said plurality of full bridge inverters using said firing reference signal and said reference table;

whereby, the alternate activation of a plurality of gate turn-off devices in said full bridge inverters may be controlled to construct an output voltage waveform having a sinusoidal approximation for use by an AC load.

* * * * *